US008191354B2

(12) United States Patent
Cavataio et al.

(10) Patent No.: US 8,191,354 B2
(45) Date of Patent: Jun. 5, 2012

(54) METHOD AND AFTERTREATMENT CONFIGURATION TO REDUCE ENGINE COLD-START NOX EMISSIONS

(75) Inventors: Giovanni Cavataio, Dearborn, MI (US); Jeong Yeol Kim, Troy, MI (US); Michael Goebelbecker, Dearborn Heights, MI (US); Paul M Laing, Canton, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 12/582,450

(22) Filed: Oct. 20, 2009

(65) Prior Publication Data

US 2011/0088373 A1    Apr. 21, 2011

(51) Int. Cl.
*F01N 5/04* (2006.01)
(52) U.S. Cl. ............... 60/280; 60/274; 60/284; 60/287; 60/288; 60/292; 60/605.1; 60/612
(58) Field of Classification Search .............. 60/274, 60/280, 285, 286, 287, 288, 291, 292, 299, 60/303, 324, 605.1, 612
See application file for complete search history.

(56) References Cited

U.S. PATENT DOCUMENTS

| | | | |
|---|---|---|---|
| 6,696,031 B1 | 2/2004 | Twigg et al. | |
| 6,823,660 B2 | 11/2004 | Minami | |
| 6,981,370 B2 * | 1/2006 | Opris et al. | 60/311 |
| 7,213,395 B2 | 5/2007 | Hu et al. | |
| 7,334,400 B2 | 2/2008 | Yan et al. | |
| 7,490,462 B2 * | 2/2009 | Roozenboom et al. | 60/278 |
| 7,571,608 B2 * | 8/2009 | Boyapati et al. | 60/612 |
| 7,788,923 B2 * | 9/2010 | Rowells | 60/612 |
| 7,861,580 B2 * | 1/2011 | Sujan et al. | 73/114.77 |
| 7,877,981 B2 * | 2/2011 | Newman | 60/280 |
| 2008/0041052 A1 | 2/2008 | Doring et al. | |

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

Systems and methods for reducing NOx emissions using a branched exhaust system with a first and second turbine including an emission-control device containing a zeolite, are described. In one example approach, a method comprises: during a first duration when exhaust temperature is below a first temperature threshold, directing exhaust gas through the second turbine and the emission-control device, and adjusting the second turbine to control intake boost; and during a second duration following the first, directing exhaust gas through the first turbine, and adjusting the first turbine to control intake boost. In this way, the first and second turbines may provide a greater degree of boost control in order to reduce boost fluctuations while enabling storing cold start NOx emissions for later reduction.

19 Claims, 8 Drawing Sheets

METHOD AND AFTERTREATMENT CONFIGURATION TO REDUCE ENGINE COLD-START NOX EMISSIONS

FIELD

The present invention relates to an engine exhaust aftertreatment system to reduce NOx emissions.

BACKGROUND/SUMMARY

Due to the time required to heat up the main aftertreatment devices to achieve catalytic light-off, NOx emissions from engine-out cold-starts add up to a significant fraction of total NOx emissions.

The inventors herein have recognized that an exhaust system, such as a branched exhaust system, with first and second turbines that includes an emission-control device containing a zeolite or similar adsorbent may be used to reduce NOx emissions during non-warmed exhaust gas conditions while providing improved boost control during engine operation.

In one example approach, a method for an exhaust system having a first turbine and a second turbine, comprises: during a first duration when exhaust temperature is below a first temperature threshold, directing exhaust gas through the second turbine and an emission-control device, and adjusting the second turbine to control intake boost; and during a second duration following the first, directing exhaust gas through the first turbine, and adjusting the first turbine to control intake boost. In one example, the emission-control device may be purged when exhaust temperature is above a second temperature threshold higher than the first temperature threshold, where during the second duration exhaust gas does not flow through the emission-control device.

In this way, during non-warmed exhaust conditions, NOx emissions may be directed through an emission-control device containing, for example, a zeolite. NOx may be adsorbed by the emission-control device while the exhaust is heated. The adsorbed NOx may then be substantially stored in the emission-control device until a NOx reducing device, e.g., an ammonia-catalyzed selective catalytic reducer, has been sufficiently heated to become catalytically active. Postponing the release of the stored NOx to a NOx reducing device in this way may decrease NOx emissions since a greater portion of the NOx emitted by the engine during non-warmed exhaust conditions is reduced.

Furthermore, in such an approach, the first and second turbines may provide a greater degree of boost control in order to reduce boost fluctuations while transitioning between different operating modes of the branched exhaust system. Furthermore, the turbines may be advantageously used to accommodate transient torque requests, and maintain boost at desired levels, for example, through coordinated control of the branched exhaust system during warmed-up operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
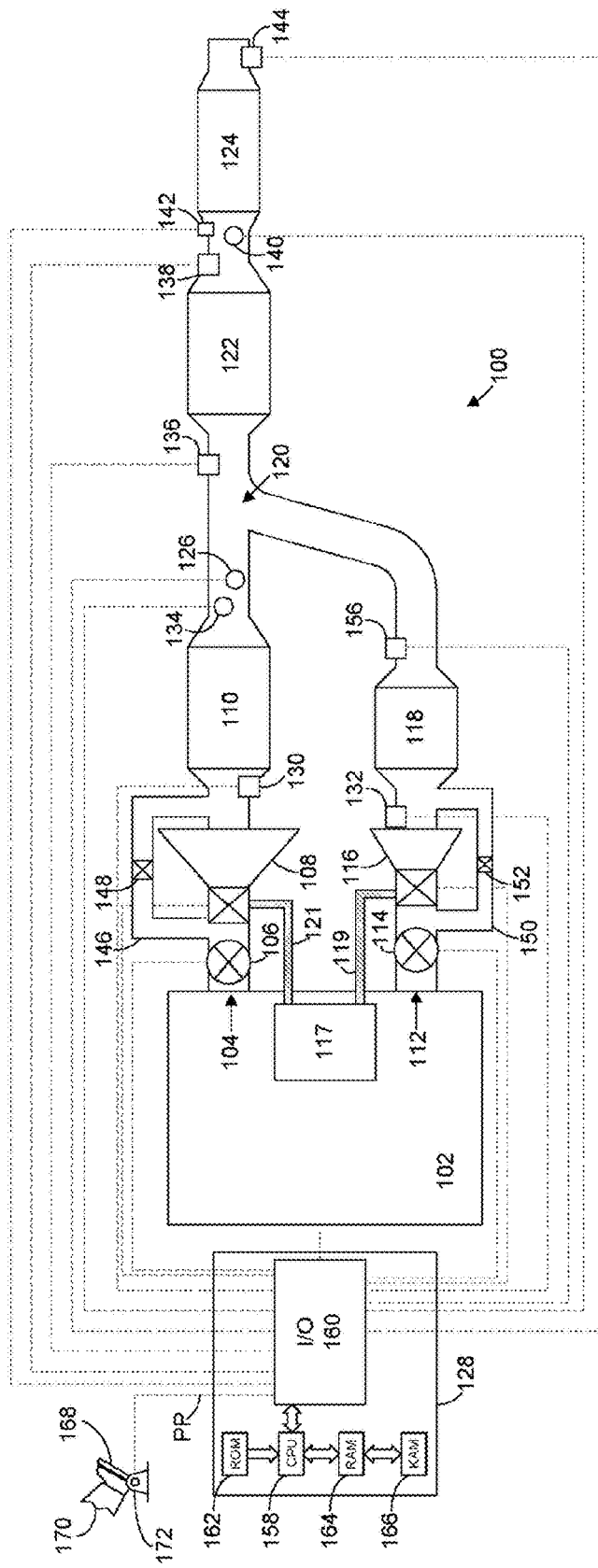
FIG. 1 shows a schematic depiction of a branched exhaust system coupled to a combustion engine.

The following description relates to systems and methods for reducing NOx emissions using an exhaust system, which is branched in one example, with two turbines coupled to a combustion engine, an example of which is shown in FIG. 1. Exhaust gas may initially be directed through an emission-control device containing a zeolite, or similar adsorbent, during non-warmed exhaust conditions, for example following an engine cold-start from rest.

Due to high pore volume and surface area, zeolites, or zeolite-like materials such as alumina, silica, or combinations thereof have the ability to adsorb high levels of water. Thus, emission-control devices containing such adsorbent materials can adsorb more water as the temperature decreases to room temperature. NOx may be adsorbed (as nitric acid, for example) within the water adsorbed within the zeolite or zeolite-like material. As the temperature of the emission-control device rises, the water adsorbed by the zeolite or zeolite-like material evaporates releasing the adsorbed NOx. Thus, once the emission control device is saturated with NOx or reaches a temperature before which stored NOx will bring to desorb, exhaust gas may be directed to bypass the emission control device. In this way, the NOx may be effectively trapped in the emission control device while a NOx reducing device is heated.

Figure 2:
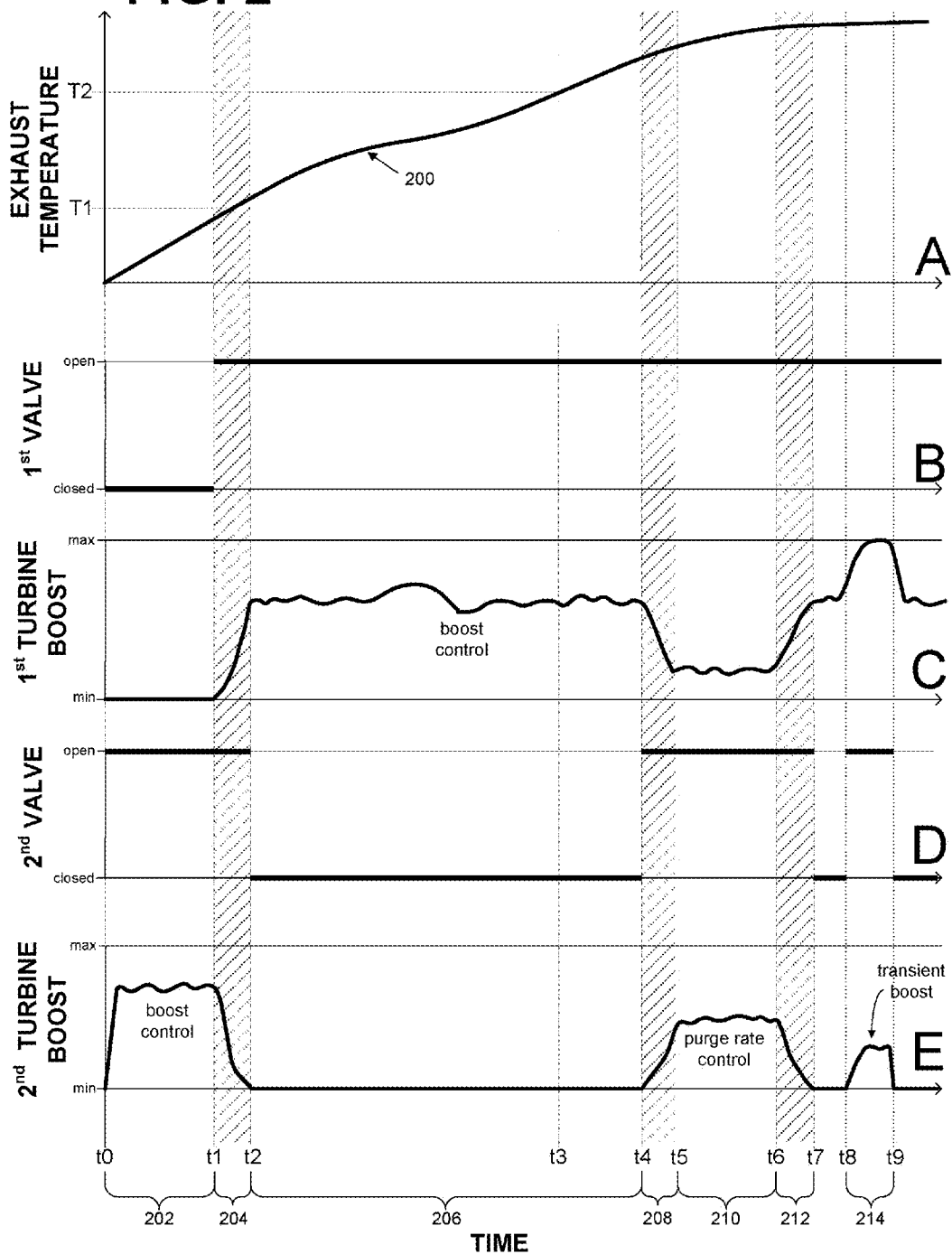
FIG. 2 shows a graphical example of exhaust gas control as exhaust temperature increases.
Figure 3:
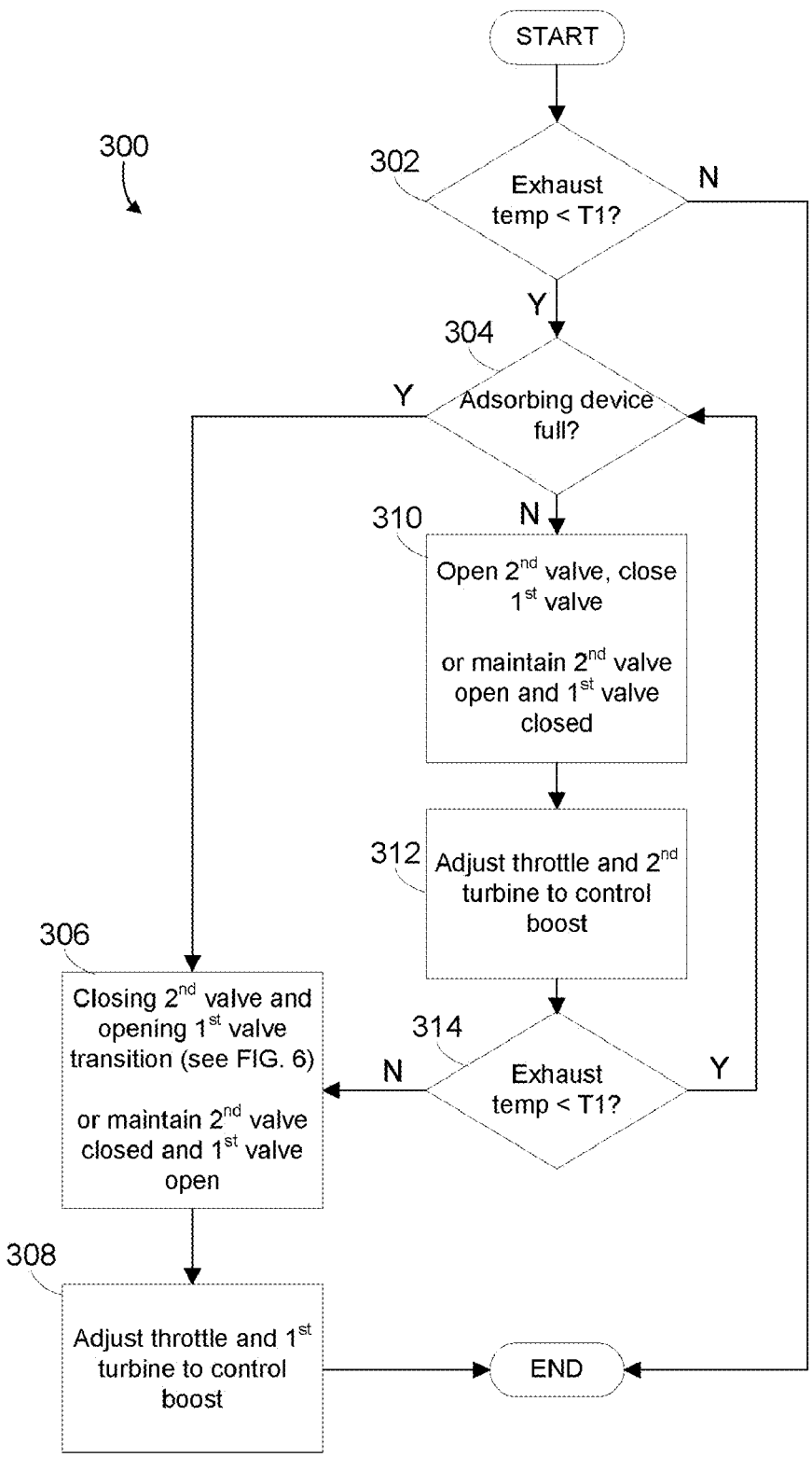
FIG. 3 shows an example routine for storing NOx emissions during non-warmed exhaust conditions.
Figure 4:
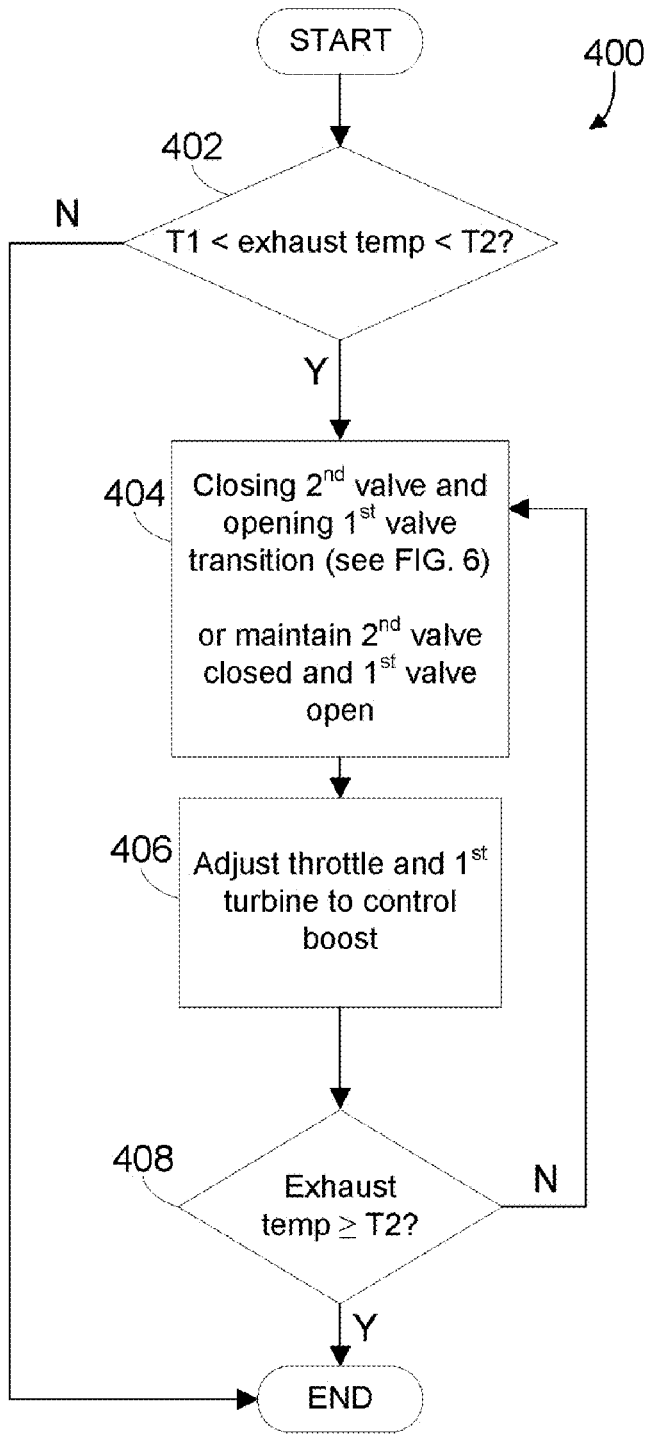
FIG. 4 shows an example routine for storage of NOx and boost control before a NOx reducing catalyst reaches light-off temperature.
Figure 5:
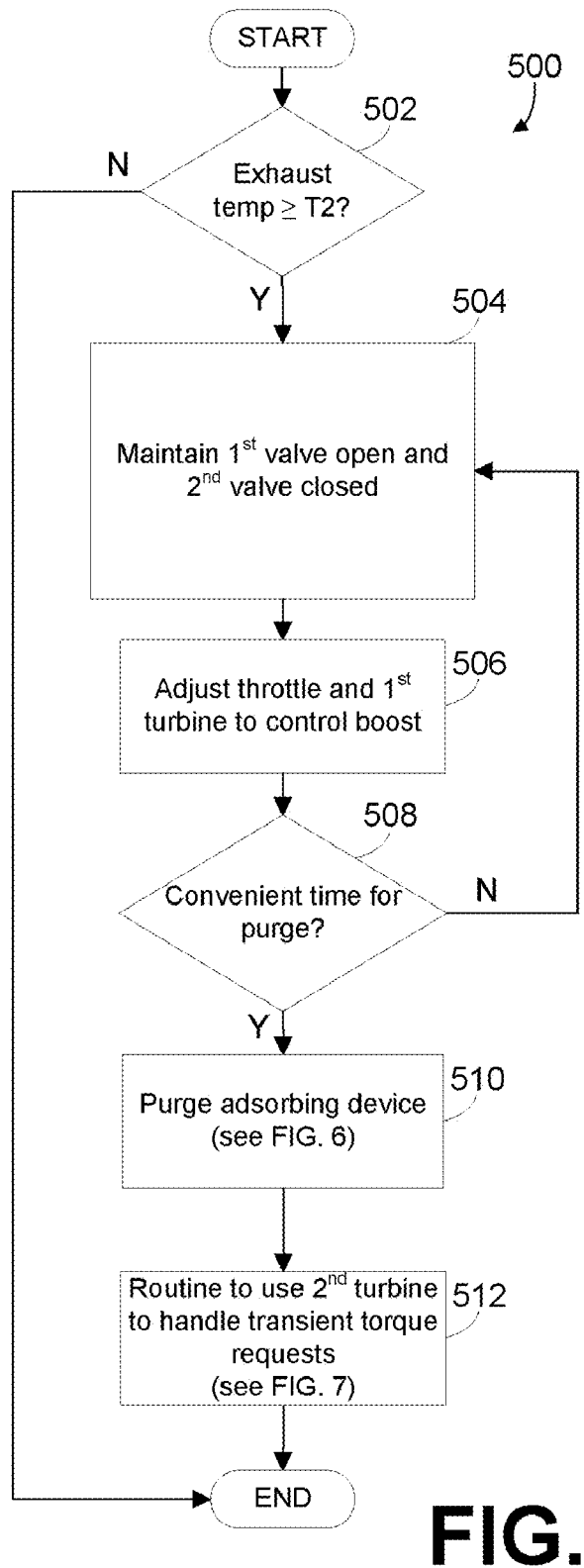
FIG. 5 shows an example routine for operating an exhaust after treatment system after a NOx catalyst has achieved light off temperature.

FIG. 2 shows a graphical example of exhaust gas control in a branched exhaust system as exhaust temperature increases. In FIG. 2, NOx is stored, trapped, then purged from the emission-control device after a NOx reducing device, e.g., an SCR, has reached a catalytic light-off temperature. FIG. 3 shows an example routine for controlling storing of NOx emissions in the emission-control device following an engine cold-start event. For example, NOx emissions may be substantially adsorbed by the emission-control device at low temperatures, e.g., at temperatures less than 60° C. for the example where the emission-control device contains a zeolite. However, once the temperature increases above a threshold temperature, the NOx may begin to desorb from the emission-control device. FIG. 4 shows an example routine for controlling trapping of the NOx stored in the emission-control device when the exhaust temperature surpasses the temperature threshold at which the NOx will begin to desorb. The NOx may be trapped in the emission-control device until the exhaust is sufficiently heated to activate the reducing catalysts in a NOx reducing device. As shown in FIG. 5, once the NOx reducing device is sufficiently heated to become catalytically active, the stored NOx may be purged as explained with regard to the routine in FIG. 7. Once the NOx is purged, the second turbine may be used to handle transient torque requests during engine operation as shown in FIG. 8.

Figure 6:
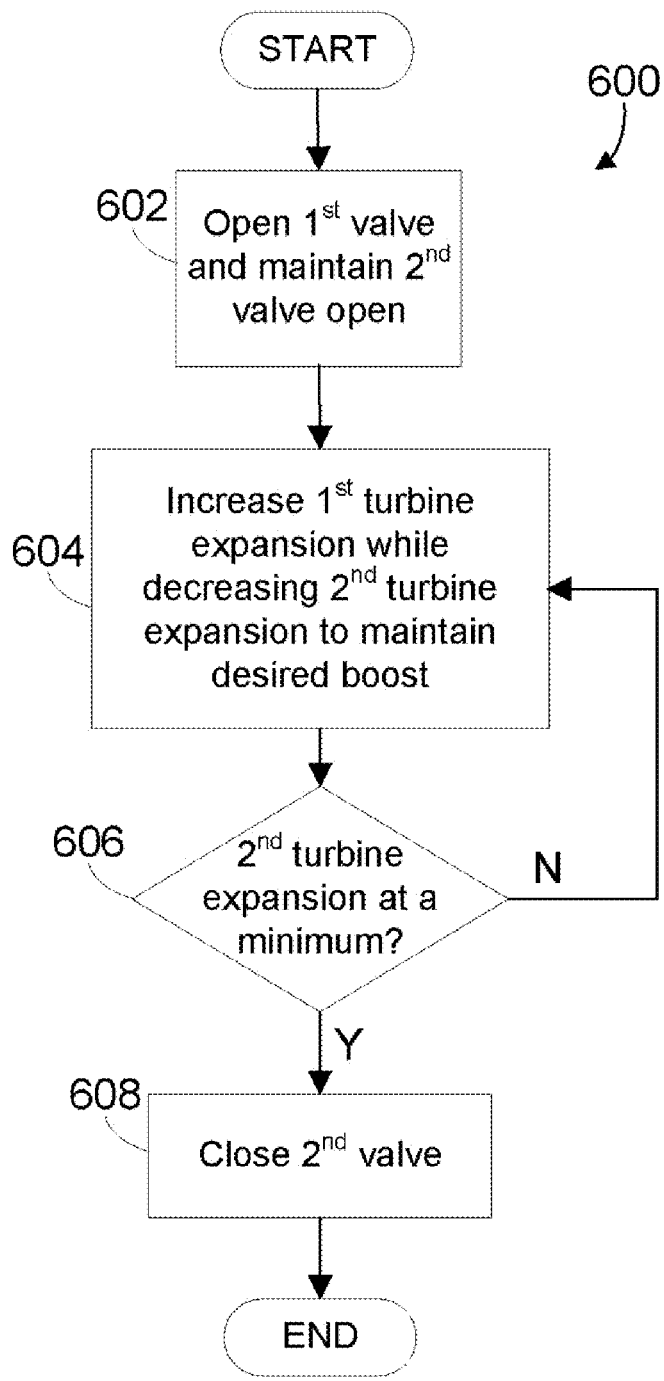
FIG. 6 shows an example routine for adjusting turbine expansion when transitioning between operating modes of a branched exhaust system.

The exhaust flow may be preferentially routed through different conduits and turbines during the routines of FIGS. 3-5 using valves, for example. When exhaust flow is transitioned from a first exhaust conduit with a first turbine to a second exhaust conduit with a second turbine using valves, there may be a duration in which the second turbine has to spin up in order to continue providing the boost previously supplied by the first turbine. The turbo lag associated with the second turbine spin up during the transition may be off-set by gradually decreasing the expansion across the first turbine in correspondence with the gradual increase in expansion across the second turbine. FIG. 6 shows one example routine for such a transition.

Turning now to FIG. 1, a schematic depiction of a branched exhaust system 100 is shown coupled to a combustion engine 102. For example, engine 102 may be a diesel engine, a gasoline engine, or a gasoline-ethanol engine. Engine 102 and exhaust system 100 may be controlled at least partially by a control system including controller 128 and by input from a vehicle operator 170 via an input device 168. In this example, input device 168 includes an accelerator pedal and a pedal position sensor 172 for generating a proportional pedal position signal PP.

The exhaust system 100 shown in FIG. 1 includes at least two exhaust conduits 104 and 112 exiting the combustion engine. The exhaust gas from engine 102 may be split into two streams and controlled by valves 106 and 114 disposed along the two exhaust conduits. The first exhaust conduit 104 may include a first valve 106 disposed therein which may be located upstream of a first turbine 108. The second exhaust conduit 112 may include a second valve 114 disposed therein which may be located upstream of a second turbine 116. For example, when valve 106 is closed and valve 114 is open, exhaust gas will flow through exhaust conduit 112 only. When valve 106 is open and valve 114 is closed, exhaust gas will flow through exhaust conduit 104 only. When both valves 106 and 114 are open, exhaust gas will flow through both conduits 112 and 104.

An exhaust aftertreatment device 118 may be disposed along exhaust conduit 112 downstream of second turbine 116. Device 118 may include a zeolite or similar adsorbent which adsorbs NOx emissions when the exhaust gas is below a temperature threshold. For example, device 118 may contain cordierite, silicon carbide, and/or metallic substrates with a washcoat consisting of any combination of precious metals, base metal oxides, zeolites, and binder material such as alumina, ceria, titania, and/or silica. For example, the emission-control device 118 may be a zeolite-based diesel oxidation catalyst (DOC) or a zeolite-based selective catalytic reducer (SCR). In other examples, device 118 may include a DOC, urea-SCR, a lean NOx trap, HC-SCR, three-way catalyst, particulate filter or combinations thereof. In another example, device 118 may include a plurality of emission-control devices, at least one of which contains a NOx adsorbing medium.

The second exhaust conduit may be cooled by a variety of methods so that the emission-control device 118 may be kept below a temperature threshold at which NOx emissions will be substantially adsorbed for a longer period of time. In one example, the second exhaust conduit may have thick walls, fins, or similar to increase the surface area of the conduit walls in order to keep the conduit cool for a longer period of time when exhaust gas is flowing through it. In another example, the second conduit may be cooled by a cooling device. In this way, more NOx may be adsorbed by device 118 during non-warmed engine exhaust system conditions.

Although valves 106 and 114 are shown upstream of the turbines in the example shown in FIG. 1, the valves may be located anywhere along the exhaust conduits such that the passage of exhaust gas may be preferentially routed by a controller. For example the valves may be located downstream of the turbines. In another example the two exhaust conduits may include a single valve configured to direct exhaust flow through the first conduit only, the second conduit only, or both the first and second conduits.

An exhaust aftertreatment device 110 may be disposed along the first exhaust conduit 104 downstream of first turbine 108. Device 110 may contain cordierite, silicon carbide, and/or metallic substrates with a washcoat consisting of any combination of precious metals, base metal oxides, zeolites, and binder material such as alumina, ceria, titania, and/or silica. For example, device 110 may include a DOC, urea-SCR, a lean NOx trap, HC-SCR, three-way catalyst, particulate filter or combinations thereof.

In one example, second turbine 116 may be smaller than first turbine 108. Since smaller turbochargers have lower total shaft inertia and can accelerate more quickly, second turbine 116 may be used to handle transient torque requests when the torque request is greater than that which the first turbine can provide with the throttle fully open. Turbines 116 and 108 may be connected to a compressor system 117 via respective shafts 119 and 121. In one example compressor system 117 may include a single compressor coupled to an intake of the engine. In another example, compressor system 117 may include an individual compressor corresponding to each turbine 108 and 116.

In one example turbines 108 and 116 may be variable geometry turbines (VGT). In another example a wastegate 146 controlled by a wastegate valve 148 may be used to divert exhaust flow around turbine 108. Likewise, a wastegate 150 controlled by a wastegate valve 152 may be used to divert exhaust flow around turbine 116. The VGTs or wastegate valves may be controlled by controller 128, for example. In this way, the amount of expansion across the respective turbines may be adjusted based on engine and exhaust system operating conditions. For example, adjusting the expansion across the respective turbines may be used to handle torque requests during different modes of exhaust system operation as described below herein with regard to FIGS. 3, 4, and 5.

The second exhaust conduit 112 joins the first conduit 104 at a branch point 120 located at a point downstream of emission-control device 118 and valve 106. Branch point 120 may be located at any point along exhaust conduit 104 downstream of valve 106. In one example, branch point 120 may be located downstream of device 110.

An aftertreatment device 122 is disposed in the exhaust conduit downstream of branch point 120. Device 122 may contain cordierite, silicon carbide, and/or metallic substrates with a washcoat consisting of any combination of precious metals, base metal oxides, zeolites, and binder material such as alumina, ceria, titania, and/or silica. For example, device 122 may include a DOC, urea-SCR, a lean NOx trap, HC-SCR, three-way catalyst, particulate filter or combinations thereof. In another example, device 122 may be any aftertreatment device which reduces NOx emissions. For example device 122 may be an SCR. In another example, device 122 may include a plurality of emission-control devices, at least one of which includes a NOx reducing catalyst. Since the NOx reducing device 122 may reduce NOx using ammonia as a catalyst, e.g., when the NOx reducing device is an SCR, a urea sprayer 126 (or any suitable ammonia source) may be located upstream of or within NOx reducing device 122. The ammonia source 126 may be controlled to preload ammonia in the NOx reducing device 122 in proportion to an amount of expected NOx entering the device. For example, controller 128 may preload ammonia in preparation for purging NOx stored in device 118.

In one example, NOx reducing device 122 may be followed downstream by an exhaust aftertreatment device 124. Device 124 may contain cordierite, silicon carbide, and/or metallic substrates with a washcoat consisting of any combination of precious metals, base metal oxides, zeolites, and binder material such as alumina, ceria, titania, and/or silica. For example, device 124 may include a DOC, urea-SCR, a lean NOx trap, HC-SCR, three-way catalyst, particulate filter or combinations thereof. However, it should be understood that the exhaust system 100 shown in FIG. 1 may include a plurality of exhaust aftertreatment devices and configurations which are not shown. For example a DPF may be located upstream of device 122. In another example, device 110 may be located downstream of NOx reducing device 122 which may in turn be followed downstream by a DPF.

The exhaust system 100 may include a plurality of sensors and actuators in communication with a controller 128. For example exhaust gas temperature (EGT) sensors 130 and 132 may be disposed between the first turbine 108 and aftertreatment device 110 and the second turbine 116 and emission-control device 118, respectively. An oxygen sensor 134, e.g., a universal exhaust gas oxygen (UEGO) sensor, may be disposed between urea sprayer 126 and aftertreatment device 110. Additionally, an EGT sensor 136 may be disposed between branch point 120 and NOx reducing device 122 and an EGT sensor 138, UEGO sensor 140, and pressure change sensor 142 may be disposed between NOx reducing device 122 and DPF 124. Further, an EGT sensor 144 may be located downstream of DPF 124.

One or more of a plurality of sensors may be used to monitor the temperature of the exhaust gas and/or the temperature of the emission-control devices disposed along the exhaust conduit. Alternatively, temperatures of various exhaust system components may be modeled. For example, temperature of an emission-control device may be determined based on mass air flow, e.g. as measured by a mass air flow sensor, and an upstream temperature sensor (e.g., sensor 154 or sensor 130).

Further, one or more of a plurality of sensors may be used to determine when the emission-control device 118 is saturated with NOx. For example, the temperature, e.g., as measured by one or more temperatures sensors disposed within conduit 112, of device 118 may be used to determine when the device is saturated with NOx. In another example, a NOx sensor may be disposed downstream of emission-control device 118. In another example, temperature sensor 132 may be used together with calibration information to determine when device 118 is saturated based on one or more temperature sensor readings, mass air flow, and an age of adsorbent medium in device 118.

Controller 128 is shown in FIG. 1 as a microcomputer, including microprocessor unit 158, input/output ports 160, an electronic storage medium for executable programs and calibration values shown as read only memory chip 162 in this particular example, random access memory 164, keep alive memory 166, and a data bus. Controller 128 may receive various signals from sensors coupled to engine 102 and exhaust system 100, in addition to those signals previously discussed.

Storage medium read-only memory 162 can be programmed with computer readable data representing instructions executable by processor 158 for performing the methods and control strategies described below as well as other variants that are anticipated but not specifically listed.

By way of example, following an engine cold-start, the first valve 106 may be closed and the second valve 114 may be opened. In this way, exhaust gas may flow through emission control device 118, which may adsorb NOx emissions. Once the exhaust temperature approaches a first temperature threshold, the exhaust flow may be directed to bypass the emission control device. The first temperature threshold may be a temperature less than or equal to a temperature at which NOx begins to desorb from the emission control device, for example. Exhaust gas may be directed to bypass the emission control device by closing the second valve 114 and opening the first valve, for example. In this way, exhaust flow may be directed through the first conduit 104. During this time, the NOx reducing device 122 may continue to be heated while the NOx is effectively trapped in emission control device 118. Once the NOx reducing device is sufficiently heated to become catalytically active, the NOx stored in emission control device 118 may be purged by opening the second valve 114. The purged NOx may then be substantially reduced by NOx reducing device 122.

The transition of exhaust flow from one conduit to another via the valves, e.g., closing the second valve 114 and opening the first valve 106 to bypass the emission control device 118, may be accompanied by adjustments to the turbines so as to reduce turbo fluctuations during the transition. Such transitioning between different modes of exhaust system operation is described in more detail below.

Routines are described below with regard to FIGS. 2-5 for controlling exhaust gas flow through a first exhaust conduit (e.g., conduit 104) and a second exhaust conduit (e.g., conduit 112), via a first valve (e.g., valve 106), disposed along the first exhaust conduit and a second valve (e.g., valve 114) disposed along the second exhaust conduit. Further the routines described below include methods for controlling boost or torque requests by adjusting the expansion across the first turbine (e.g., turbine 108) and the second turbine (e.g., turbine 116) based on vehicle and engine operating conditions, vehicle operator requests, and/or exhaust system operating conditions. The routines may be implemented during an engine cold-start from rest or at any point during engine operation.

Turning to FIG. 2, a graphical, prophetic, example of controlling exhaust flow through a branched exhaust system (e.g., exhaust system 100) via the first and second valves while adjusting the expansion of the first and second turbines as exhaust temperature increases, is shown.

In FIG. 2A, an exhaust temperature curve 200 is shown as a function of time starting at a time t0. Time t0 may be a time at which the exhaust temperature is below a first threshold temperature T1. The first temperature threshold T1 may be a temperature below which NOx will be substantially adsorbed by the emission-control device (e.g., device 118) and above which NOx will be substantially desorbed by the emission-control device. In one example, time t0 may be an engine cold-start from rest. In another example, time t0 may be a time during engine operation when the exhaust temperature is below the first temperature threshold T1.

As shown in FIGS. 2B and 2D, for a first duration 202 starting at time t0, the first valve (e.g., valve 106) is closed and the second valve (e.g., valve 114) is opened to route exhaust gas through an emission-control device (e.g., device 118) disposed along the second exhaust conduit. During this time, the second turbine (e.g. turbine 116) is used to provide the boost required by the engine as shown in FIG. 2E. In other words, the expansion across the second turbine is adjusted, e.g. via the VGT or the wastegate valve, to meet and maintain the desired intake boost according to operating conditions, driver demands, etc.

During the first duration 202, NOx emissions may be substantially adsorbed by the emission-control device downstream of the second valve. The first duration 202 is bounded above by time t1. In one example, time t1 may be the time at which the exhaust temperature reaches the first temperature threshold T1. In another example, the time t1 may be a time before the exhaust temperature reaches the temperature threshold T1. For example, a transition 204 of the flow of exhaust gas from the second conduit to the first conduit may be initiated prior to the exhaust temperature reaching the first temperature threshold T1 so that the NOx adsorbed by the emission-control device will not begin to desorb during the transition.

Emission control devices disposed in the exhaust downstream of the branch point 120 may be heated during the first duration 202. For example, since, the NOx reducing device 122 is located downstream of branch point 120, the NOx reducing device is heated during the first duration.

The exhaust gas may flow through the emission-control device via the second conduit (e.g., conduit 112) until the first duration 202 has passed. At the end of the first duration 202, at time t1, the transition duration 204 (indicated by a shaded region) begins. The transition duration 204 provides for adjustment of the expansion across the first and second turbines, e.g., by adjusting the VGTs or the wastegate valves of the turbines, as the exhaust is routed from the second conduit controlled by the second valve to the first conduit controlled by the first valve. Adjustment of the expansion across the first and second turbine serves to reduce boost fluctuations associated with turbo lag as the switch occurs. During the transition duration 204 both the first and second valves remain open as shown in FIGS. 2B and 2D. As shown in FIG. 2E, the expansion across the second turbine is gradually decreased to a minimum expansion during the transition duration ending at time t2. The expansion across the first turbine is correspondingly increased from a minimum expansion at t1 to an expansion amount sufficient to meet the desired engine boost at t2. Once the transition duration is complete at t2, the second valve is closed while the first valve remains open. In this way, the turbo lag which occurs as the first turbine spins up is off-set by the gradual decrease in the expansion across the second turbine. Thus fluctuations in boost may be reduced during the transition of exhaust gas flowing from the second conduit to the first. Furthermore, during the transition, adjustments in desired boost may be addressed by adjusting the expansion across the first turbine.

Following the transition duration 204, the first valve (e.g., valve 106) is opened and the second valve (e.g., valve 114) is closed for a duration 206. During this time the exhaust flows through the first conduit and first turbine and does not flow through the second conduit and the emission-control device (e.g., device 118). Since exhaust gas did not flow through device 110 during the first duration 202, device 110 may be cold at the beginning of duration 206. However, as described above, emissions may be at least partially reduced by emission control devices located downstream of branch point 120, e.g., devices 122 and 124, since such devices were at least partially heated during the first duration 202. Further, engine out emissions during duration 206 may be significantly less than engine-out emissions during the first duration 202. In one example, device 110 may also contain a zeolite or similar adsorbent. In such a scenario, device 110 may adsorb NOx during duration 206 before the temperature of device 110 reaches a threshold temperature at which NOx will begin to desorb from device 110. In this way, the NOx stored in device 110 may be released when the downstream NOx reducing device 122 is heated to a higher temperature as compared with the temperature of the NOx reducing device 122 at the beginning of duration 206.

Closing the second valve during the duration 206 effectively traps the NOx emissions in the emission-control device (e.g., device 118) while the NOx reducing device (e.g., device 122) is heated up to a greater extent than during the first duration 202. During duration 206, the first turbine (e.g., turbine 108) provides the boost required by the engine as shown in FIG. 2C. In other words, the expansion across the first turbine is adjusted, e.g. via the VGT or the wastegate valve, to meet and maintain the desired intake boost.

A second temperature threshold T2 shown in FIG. 2A may be a temperature at which the NOx reducing device (e.g., device 122) reaches catalytic light-off conditions. In other words, exhaust temperature T2 may be the temperature at which the NOx reducing device becomes sufficiently catalytically active. Time t3 in FIG. 2 is the time at which the exhaust temperature becomes sufficiently heated so that the NOx reducing device becomes catalytically active. Since the NOx reducing device becomes catalytically active at t2, initiation of a purge of the NOx stored in the emission-control device may occur at any time t4 at or after time t3.

Once the exhaust temperature reaches the second threshold T2, the time t4 at which a purge of the emission-control device (e.g., device 118) is initiated may depend on a variety of engine and exhaust system operating conditions. For example, a purge of the emission-control device may be initiated at a time when boost fluctuations associated with opening the second valve would be less noticeable. In one example, a purge of the emission-control device may be initiated when the vehicle is operating at low speed or low load conditions. Furthermore, since purging NOx stored in the emission-control device will increase the NOx emissions entering the NOx reducing device, the initiation of the purge may also depend on an ammonia storage amount. For example, the time t4 to initiate purging may be further based on an ammonia storage amount greater than a threshold value. In this way sufficient reductant may be available to reduce the purged NOx.

At time t4, the second valve is opened to release the NOx adsorbed by the emission-control device during the first duration 202. In one example, immediately before purging is initiated at t4, ammonia may be preloaded into the NOx reducing device, e.g., via urea sprayer 126. The released NOx may then flow through the NOx reducing device (e.g., device 122) which is heated to a higher temperature than during the first duration. For example, the NOx reducing device may be sufficiently heated to become sufficiently catalytically active to effectively reduce the NOx desorbed from the emission-control device.

During the purge duration starting at t4 and ending at t7, the first valve remains open and the second valve is opened, as shown in FIGS. 2B and 2D. Once the purge duration is initiated and the second valve is opened, the second turbine may be adjusted to control the purge rate. However, due to turbo lag, there may be a transition duration 208 in which the expansion of the second turbine gradually increases as the turbine spins up as shown in FIG. 2E. During this transition 208, the expansion across the first turbine may be proportionally decreased to maintain a desired boost. In this way boost fluctuations may be reduced.

Once the second turbine has spun up to a desired level of expansion corresponding to a desired purge rate at time t5, the first turbine may be adjusted to meet and maintain boost requests during the duration 210, as well as to counter adjustments of the second turbine (the adjustments of the second turbine controlling the purge rate or purge flow from device 118). For example, if during the purge a high torque or boost request is made by the engine, the expansion across the first turbine will increase to accommodate the high boost request while the second turbine will remain at a substantially constant expansion corresponding to the desired purge rate.

The purge rate may depend on a variety of operating conditions of exhaust components. For example, a desired purge rate may depend on the temperature of one or more emission-control devices in the exhaust system, the exhaust gas space velocity as determined, for example, by a mass air flow sensor, the age of the catalysts in the emission-control devices, among others.

An ending of the purge duration may be initiated at a time t6. Time t6 may occur at any time after the initiation of the purge at t4. In one example, time t6 may occur at a time such that the purge duration was long enough to substantially release the NOx trapped in the emission-control device. For example, the temperature of the emission-control device may be monitored by one or more sensors to determine if the temperature has risen above a threshold value, thus indicating that the device has been sufficiently purged to initiate the ending of the purge at t6. In another example, the end of the purge duration may be initiated before the device is sufficiently purged. For example the ending of the purge may be initiated when the NOx stored in the emission-control device is below a threshold value.

Once the ending of the purge is initiated at t6, the expansion across the second turbine is gradually decreased to a minimum expansion during a transition duration 212 to end the purge, as shown in FIG. 2E. Correspondingly, the expansion across the first turbine is gradually increased from a minimum expansion at t6 to an expansion at t7 sufficient to meet the desired boost, as shown in FIG. 2C. Following the transition duration 212, the second valve is closed while the first valve remains opens, as shown in FIGS. 2B and 2D.

Following the purge duration, the first turbine (e.g., turbine 108) provides the primary boost required by the engine for the remainder of engine operation 208. In other words, the expansion across the first turbine is adjusted, e.g. via the VGT or the wastegate valve, to meet and maintain the desired boost. However, when a torque or boost is requested beyond what the first turbine can provide at maximum expansion with the throttle fully open, then the second valve may be opened and the second turbine (e.g., turbine 116) adjusted to accommodate the transient torque request. Alternatively, such operation may occur where the first turbine operation is limited, e.g., due to compressor surge limits, or other limits on operation of the first turbine. An example of such a transient torque request is shown beginning at time t8 in FIG. 2.

At time t8, a transient torque request beyond what the first turbine can provide at maximum expansion is identified. For example, the identification of such a transient torque request may be based on the expansion of the first turbine surpassing a threshold expansion value. In another example, the identification of such a transient torque request may be based on the first turbine being at maximum expansion yet unable to meet the desired boost request.

Once such a transient torque request is identified at t8, the second valve is opened as shown in FIG. 2D. The second turbine then spins up to provide the additional torque as shown in FIG. 2E. Due to turbo lag, it may be advantageous to open the second valve to activate the second turbine at a time prior to the first turbine reaching maximum expansion. In this way, turbo lag conditions may be reduced since the second turbine is already spinning when the first turbine reaches maximum expansion. Once the transient torque request has been ended, the transient torque duration 214 ends. In one example, the second valve may be closed to end the transient torque duration. In another example, the expansion across the second turbine may be decreased gradually to a minimum value before closing the second valve in order to reduce boost fluctuations. Adjustments made to the second turbine may be accompanied by a corresponding adjustment in the first turbine in order to maintain the desired boost. In one example, such an interplay of turbine adjustments depends on boost requests made by the engine, for example in response to driver tip-ins.

Following the above example durations, the second valve may additionally be opened periodically during engine operation for diagnostic purposes, for example during routines which monitor the efficiency or age of catalysts in the emission-control devices. Again, during transitions in such operation, one turbine may be adjusted to compensate for spinning-up and/or spinning-down of the other turbine.

Turning now to FIG. 3, an example method 300 which reduces NOx emissions by storing NOx in an emission-control device containing a zeolite, or similar adsorbent, during non-warmed exhaust conditions, is shown. Routine 300 may be implemented during an engine cold-start event or at any point during engine operation.

At 302, routine 300 determines whether the exhaust temperature is less than a first temperature threshold T1. The exhaust temperature may be determined by one or more temperature sensors located along the exhaust gas aftertreatment system. In the example shown in FIG. 1, the exhaust gas temperature may be determined by EGT sensor 132, for example. In another example, exhaust gas temperature may be determined by a combination of measurements from one or more of the EGT sensors 130, 132, 136, 138, and 144. In still another example, the exhaust temperature may be modeled based on various engine operating parameters. The first temperature threshold T1 may be a temperature below which NOx will be substantially adsorbed by the emission-control device (e.g., device 118) and above which NOx will be substantially desorbed by the emission-control device. For example, when emission-control device is an SCR containing a zeolite, the first temperature threshold may be in the range 50°-60° C. If the exhaust temperature is less than the first temperature threshold T1 at 302, the routine proceeds to step 304.

At 304, routine 300 checks whether the adsorbing device is full. In other words, routine 300 checks whether the adsorbing device is saturated with NOx. For example, if the engine is started and stopped multiple times before the emission-control device is purged, the adsorbing device may become saturated with NOx so that NOx can no longer be stored in the device even when the exhaust temperature is below the first threshold. In another example, the emission-control device may become saturated with NOx before the temperature reaches the first threshold. For example, the size and age of the adsorbing medium may determine the amount of NOx that can be adsorbed. Thus, following a first engine start when the emission-control device is less saturated with NOx, the exhaust flow may be directed through the second turbine and the emission-control device and an expansion across the second turbine may be adjusted to provide boost. Following a second engine start different from the first, when the emission control device is more saturated with NOx, the exhaust flow may be directed to bypass the emission control device and flow through the first turbine and an expansion across the first turbine may be adjusted to provide boost.

Furthermore, the length of the NOx storing duration 202 may depend on an amount of NOx stored in the emission control device at an engine start. For example, if a first start with a first amount of NOx in device 118 gives a first length of duration 202, a second start, different from the first start, with a second amount (higher than the first) of NOx in device 118 may give a second length of duration 202, the second length shorter than the first. Thus, if multiple starts take place during non-warmed conditions, the duration 202 may become shorter as the amount of NOx stored in emission control device 118 increases. In one example, the amount of NOx stored in emission control device 118 may reach a threshold amount indicating that the device is fully saturated following multiple engine starts during non-warmed conditions. In such a scenario, the first duration 202 may not occur, since no more NOx can be stored in device 118, and the exhaust system will operate with the second valve closed and the first valve open until conditions for initiating a purge of device 118, as discussed in more detail below, are met.

Detection of NOx saturation of the adsorbing device in step 304 may take place by a variety of ways. For example, the amount of stored NOx may be determined based on a NOx sensor disposed downstream of device 118. In another example, a temperature sensor may be used together with calibration information to determine when the device is saturated based on mass air flow, and an age of adsorbent medium in device. In another example, NOx saturation may be based on the amount of exhaust flowing through the emission-control device. For example, a calibrated threshold may be stored in the memory of the controller to indicate when the emission-control device is full based on an amount of exhaust gas flowing through the device. In another example, NOx saturation may be based on a previous engine operation prior to the engine start. As such, various engine and exhaust operating parameters may be stored in the memory of the controller and used to determine the amount of NOx stored in the emission control device. Examples of such parameters may include an amount of NOx stored in the emission control device during a previous engine operation prior to the start, the last time the device was purged, if the purge was long enough, etc. If the emission control device is determined to be full at 304, routine 300 proceeds to 306.

At 306, routine 300 transitions to closing the second valve (e.g., valve 114) and opening the first valve (e.g., valve 106). As described above with regard to FIG. 2, this transition includes opening the first valve, decreasing the expansion across the second turbine (e.g., turbine 116) and correspondingly increasing the expansion across the first turbine (e.g., turbine 108). An example routine for transitioning to closing the second valve and opening the first valve is described in more detail below with regard to FIG. 6. At 308 in routine 300, the first turbine is used to provide and maintain the desired boost.

In this way, when operating the exhaust system with the first valve open and the second valve closed, the NOx remains stored in the emission-control device until the exhaust temperature is sufficiently heated so that the NOx reducing device achieves catalytic light-off.

If at 304 the emission-control device is not completely saturated, then the routine proceeds to 310. At 310, the second valve (e.g., valve 114) is opened or maintained opened and the first valve (e.g., valve 106) is closed or maintained closed. During this step, the NOx in the exhaust gas passing through the second exhaust conduit (e.g., conduit 112) is substantially adsorbed by the emission-control device. In this way, NOx emissions will be stored in the zeolite medium in the emission-control device. At 312, routine 300 adjusts the second turbine, e.g., via the VGT or wastegate valve, to meet and maintain desired engine boost.

At 314, routine 300 again determines whether the exhaust temperature is less than the first temperature threshold T1. If the exhaust temperature is still below the first temperature threshold T1 at 314, then the routine proceeds back to step 304. In this way routine 300 continuously monitors exhaust temperature and NOx storage while NOx emissions enter the emission-control device. NOx may continue to be substantially adsorbed by the emission-control device until either the emission-control device is full at 304 or until the temperature rises above the first temperature threshold T1 at 314. Once the exhaust temperature rises above the first temperature threshold T1 at 314, the NOx adsorbed by the emission-control device will begin to desorb, thus the routine proceeds to 306.

At 306, routine 300 transitions to closing the second valve (e.g., valve 114) and opening the first valve (e.g., valve 106). As described in more detail below with regard to FIG. 6. The routine then proceeds to 308 where the first turbine is used to provide and maintain the desired boost.

Turning now to FIG. 4, a routine 400 for operating the exhaust system while trapping NOx in the emission-control device (e.g., device 118), handling boost requests, and heating the NOx reducing device, is shown.

At 402, routine 400 determines if the exhaust temperature is greater than the first temperature threshold and less than a second temperature threshold T2. In one example, the second temperature threshold T2 may be any temperature greater than the first temperature threshold T1. In another example, the second temperature threshold T2 is a temperature at which the NOx reducing device, e.g. device 122, reaches a catalytic light off temperature. If the exhaust temperature is in this temperature range at 402, the routine proceeds to 404.

At 404, routine 400 transitions to closing the second valve (e.g., valve 114) and opening the first valve (e.g., valve 106). This transition includes opening the first valve, decreasing the expansion across the second turbine (e.g., turbine 116) and correspondingly increasing the expansion across the first turbine (e.g., turbine 108). An example routine for transitioning to closing the second valve and opening the first valve is described in more detail below with regard to FIG. 6. At 408 in routine 300, the first turbine is used to provide and maintain the desired boost.

With the second valve (e.g. valve 114) closed and the first valve (e.g. valve 106) opened, no exhaust gas flows through the second conduit (e.g. conduit 112) and the NOx remains effectively trapped in the emission-control device. At 406 in routine 400, the first turbine (e.g. turbine 108) is used to meet and maintain engine boost requests.

At 408, routine 400 determines whether the exhaust temperature reaches or surpasses the second temperature threshold T2. As described above, the second temperature threshold may be the temperature at which the NOx reducing devices reaches catalytic light-off conditions. If the exhaust temperature is still below the second temperature threshold T2 at 408, then the routine proceeds back to step 404. In this way, routine 400 continuously monitors the exhaust temperature while handling boost requests by making adjustments to the first turbine, e.g., adjusting the VGT or the wastegate valve of the first turbine. Once the exhaust temperature reaches or surpasses the second threshold temperature T2 at 408, the routine ends.

FIG. 5 shows an example routine 500 for operating an exhaust after treatment system after the exhaust temperature reaches or surpasses the second temperature threshold T2. In the temperature regime of routine 500, the NOx reducing device may be sufficiently catalytically active to reduce NOx emissions. Thus, the NOx stored in emission-control device may be purged. Once, the emission-control device is purged, the two turbines may be coordinated and utilized to advantageously provide improved boost control while not having to be concerned about the storage/release of NOx since all of the stored NOx has been purged. For example, the second turbine (e.g., turbine 116) may be used to handle transient torque requests which are beyond what the first turbine can provide at maximum expansion with the throttle fully opened. Furthermore, during the purging of the emission-control device, both the first and second turbines are in operation. During this time, adjustments of the second turbine expansion may control the purge rate while the expansion of the first turbine may be adjusted correspondingly so as to reduce turbo fluctuations and maintain the desired boost.

At 502, routine 500 checks whether the exhaust temperature is greater than the second temperature threshold T2. As described above, the second temperature threshold T2 may be a temperature at which the NOx reducing device achieves catalytic light-off. If the exhaust temperature is greater than or equal to the second temperature threshold T2 at 502, the routine proceeds to 504.

At 504 in routine 500, the second valve (e.g., valve 114) maintained the first valve (e.g., valve 106) maintained open. During this time the first turbine (e.g., turbine 108) is used to accommodate boost requests. Thus, at 506 the expansion across the first turbine is adjusted to meet boost requirements.

At 508 in routine 500, the routine checks whether engine or exhaust operating conditions are such that it is a convenient time to purge the NOx stored in the emission-control device (e.g., device 118). A convenient time to purge may occur at a time during engine operation where turbo fluctuations are less noticeable, for example, such as when turbocharger speed is above a threshold value. Additionally, a convenient purge time may be during relatively low exhaust gas space velocity conditions so that the relatively large amount of NOx released by the emission-control device during the purge will pass through the NOx reducing device at a relatively low space velocity to increase reaction efficiency. For example, exhaust gas flow rate may be monitored by one or more of a plurality of sensors and the device purged when exhaust gas flow rate is less than a threshold amount. In another example, a convenient time to purge may be during low vehicle speed conditions (e.g., less than a threshold vehicle speed). In still another example, a convenient time to purge may be during low engine load conditions (e.g., engine load being less than a threshold engine load amount). In yet another example, a convenient time to purge may occur while the engine is idling after warming up. Furthermore, a convenient time to purge may be based on an ammonia storage amount greater than a threshold value. In this way, sufficient reductant may be available to the NOx reducing device, e.g., SCR 122, prior to purging the NOx from the emission-control device 118.

If a convenient time for purging the emission-control device is not identified at 508, routine 500 proceeds back to 504. At 504, the first valve is maintained opened and the second valve is maintained closed and the first turbine provides and maintains the boost at 506.

However, once a convenient time to purge is identified at 508, the routine proceeds to 510. At 510, the emission-control device is purged. An example routine for purging the emission-control device is described below herein with regard to FIG. 7. Once the emission-control device is purged at 510, the routine proceeds to 512.

At 512, routine 500 uses the second turbine (e.g., turbine 116) to handle transient torque requests beyond what the first turbine can provide at maximum expansion. An example routine for using the second turbine to handle transient torque request is described below herein with regard to FIG. 8.

Turning now to FIG. 6, an example routine 600 for adjusting turbine expansion when transitioning between operating modes of a branched exhaust system, is shown. Before routine 600 is initiated, the first valve (e.g., valve 106) is closed and the second valve (e.g., valve 114) is open. For example, during the NOx storage mode during low exhaust temperatures shown in FIG. 3.

At 602 in routine 600, the first valve is opened and the second valve is maintained opened. The routine then proceeds to 604. At 604, the expansion across the first turbine (e.g., turbine 108) is increased while the expansion across the second turbine (e.g., turbine 116) is decreased. The decrease in expansion of the second turbine may be in proportion to the increase in expansion across the first turbine. For example, once the first valve is opened, the expansion across the second turbine may be decreased to compensate for the turbo lag associated with the first turbine spinning up to meet the boost requirements. The expansion across the second turbine continues to decrease in correspondence with the increase in expansion across the first turbine until the expansion across the second turbine reaches a minimum value at 606. Once the second turbine reaches a minimum expansion value, the second valve is closed at 608. In this way, the turbo lag which occurs as the first turbine spins up is off-set by the gradual decrease in the expansion across the second turbine. Thus, fluctuations in boost may be reduced during the transition of exhaust gas flowing from the second conduit to the first.

Figure 7:
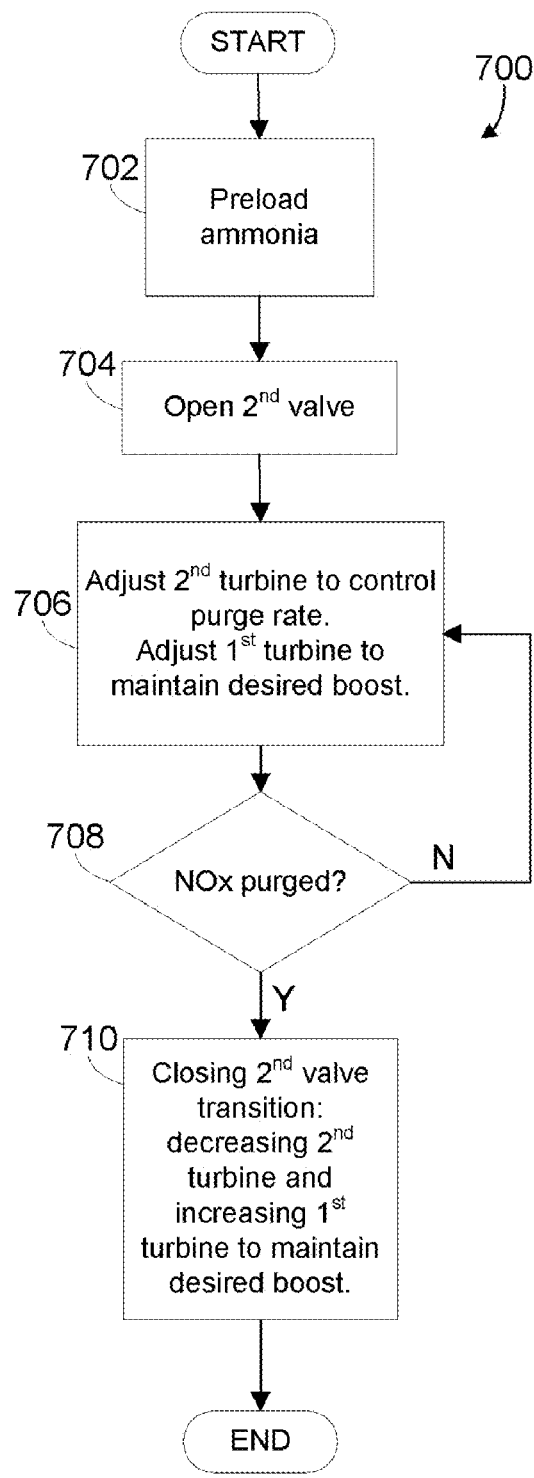
FIG. 7 shows an example routine for purging stored NOx.
Figure 8:
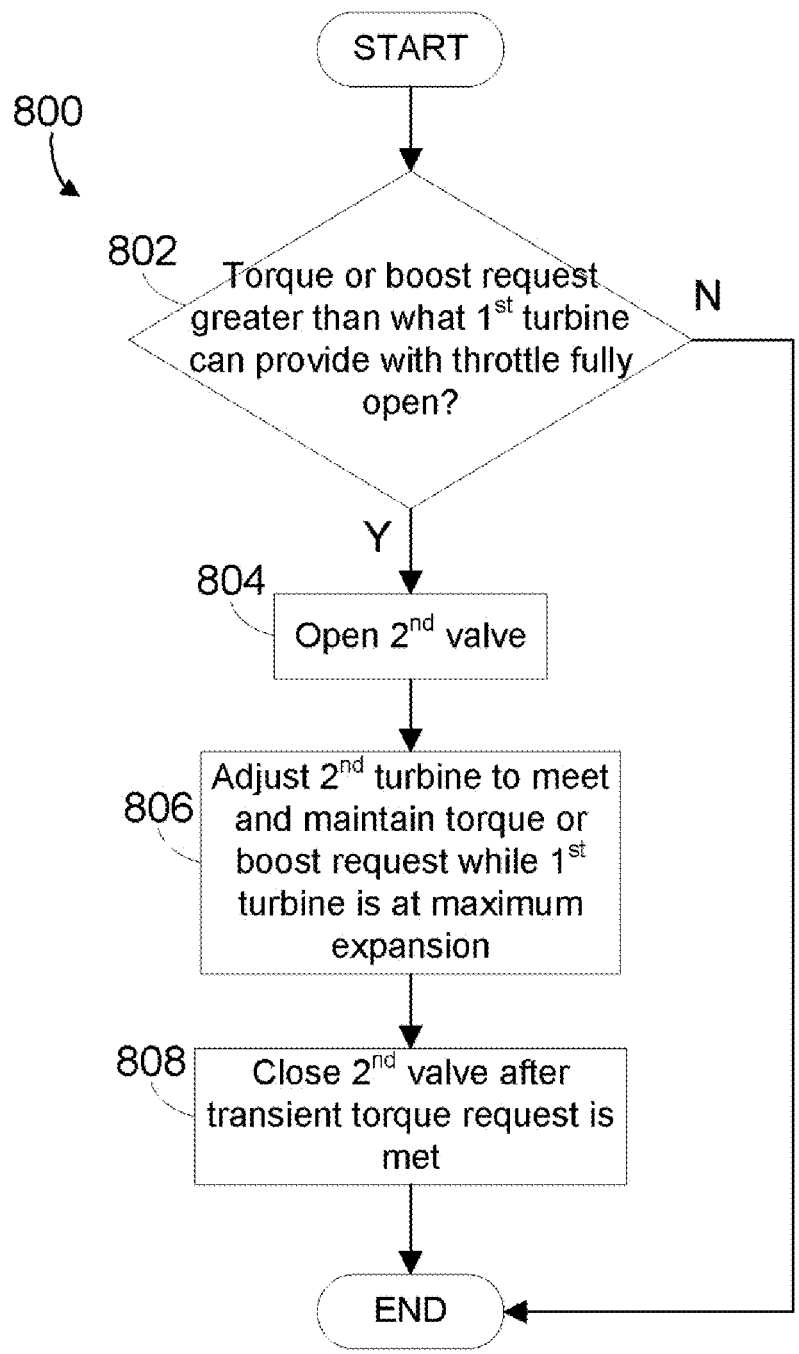
FIG. 8 shows an example routine for handling transient torque requests.

Turning now to FIG. 7, an example routine 700 for purging NOx stored in the emission-control device, is shown. At 702 in routine 700, a reductant may be preloaded into the exhaust system in preparation for the purge. For example, when the NOx reducing device is an SCR, ammonia may be preloaded in preparation for purging the emission-control device. The amount of preloaded reductant may depend on the amount of NOx stored in the emission-control device, for example, which may depend on a duration of storing operation, ambient temperature conditions, etc. Further, the amount of preloaded ammonia may depend on the amount of stored ammonia before the purge operation is initiated. For example, if there is already a high amount of stored ammonia when initiating a purge, reduced preloading may be used, and vice versa.

At 704 in routine 700, the second valve (e.g., valve 114) is opened to initiate the purge event. Once the second valve is opened, exhaust gas will begin flowing through the emission-control device. Thus the NOx stored in the emission-control device will be released at a rate proportional to the rate of exhaust gas flowing through the emission-control device. Thus at 706 in routine 700, the expansion across the second turbine is adjusted to control the purge rate. The adjustment of the second turbine to control purge rate may depend on a variety of engine and exhaust system operating parameters. For example, the adjustment may depend on one or more of a plurality of an exhaust gas air flow rate, vehicle speed, engine load, and exhaust temperature.

At 706, the first turbine is adjusted in correspondence to the adjustment made to the second turbine to maintain the desired boost and to reduce turbo fluctuations which may occur upon opening of the second valve, for example. For example, the expansion across the first turbine may be gradually decreased following the opening of the second valve in order to compensate for the turbo lag associated with the time it takes the second turbine to spin up. Also, if the expansion across the second turbine is increased to increase the purge rate, the expansion across the first turbine may be proportionally decreased. Likewise, if the expansion across the second turbine is decreased to decrease the purge rate, the expansion across the first turbine may be proportionally increased to compensate.

At 708 in routine 700, the routine checks if the NOx is sufficiently purged from the emission-control device. For example, the routine may monitor the amount of NOx stored in the emission-control device by one of the methods described above. In another example, the routine may determine whether the NOx is sufficiently purged based on an amount of time that exhaust flows through the emission-control device below a threshold value. In still another example, the routine may determine whether the NOx is sufficiently purged based on a temperature of the emission-control device begin purged. In another example, a downstream sensor, e.g., a NOx sensor or NH3 sensor downstream of an SCR, may be used to determine when NOx purging is complete.

If the NOx is not sufficiently purged, routine 700 continues back to 706 to continue purging. However, once the device is sufficiently purged at 708, the routine proceeds to 710. At 710 the expansion across the second turbine is decreased to a minimum vale while the expansion across the first turbine is correspondingly increased to maintain the desired boost. Once the expansion across the second turbine is at a minimum value, the second valve is closed. As described above, transitioning between different exhaust system modes in this way may reduce turbo fluctuations when switching the exhaust gas flow from one turbine to the other.

Turning now to FIG. 8, an example routine 800 for handling transient torque requests using the second turbine (e.g., turbine 116), is shown. At 802, routine 800 checks whether a torque or boost request is made that is greater than what the first turbine can provide when at maximum expansion with the throttle fully open. If the answer to 802 is yes, the routine proceeds to 804. At 804 in routine 800, the second valve (e.g., valve 114) is opened and the routine proceeds to 806. At 806, the second turbine (e.g., turbine 116) is adjusted, e.g., via a VGT or wastegate valve, to meet and maintain the torque or boost request made in step 802. At 808, the second valve is closed after the transient torque request has been met.

As described above with regard to FIG. 2, once the second valve is opened at step 804, the second turbine spins up to provide the additional boost. However, due to turbo lag, it may be advantageous to open the second valve to activate the second turbine at a time prior to the first turbine reaching maximum expansion. In this way, turbo lag conditions may be reduced since the second turbine is already spinning when the first turbine reaches maximum expansion. In one example, once the transient torque request has been met using the additional turbine, the second valve may be closed to end the transient torque duration. In another example, the expansion across the second turbine may be decreased gradually to a minimum value before closing the second valve in order to minimize boost fluctuations.

In one example, an exhaust system coupled to a combustion engine is provided, comprising: a first conduit with a first turbine and second conduit with a second turbine which join at a branch point downstream of the turbines; a NOx reducing device located downstream of the branch point; an emission-control device disposed along the second conduit upstream of the branch point; a first valve disposed along the first conduit upstream of the branch point; a second valve disposed along the second conduit upstream of the emission-control device; a computer readable storage medium having instructions encoded thereon, including: instructions to direct exhaust gas exhaust gas for a first duration through the second turbine and the emission-control device when exhaust temperature is below a first temperature threshold; instructions to adjust an expansion across the second turbine to control boost during the first duration; instructions to direct exhaust gas through the first turbine for a second duration following the first duration; instructions to adjust an expansion across the first turbine to control boost during the second duration; and instructions to direct exhaust gas through the emission-control device when exhaust temperature is above a second temperature threshold higher than the first temperature threshold. The emission-control device may include a zeolite. And the turbines may be variable geometry turbines or include wastegates.

The systems and methods described above may also be applied to cold-start hydrocarbon (HC) emission control. HC emissions may also be adsorbed by emission control device 118 when the exhaust temperature is below a first temperature threshold. As described above with regard to NOx emission control, stored HC emissions may also be trapped in the emission control device 118 until a time at which a downstream HC reducing device is sufficiently heated to become catalytically active. HC stored in the emission control device may then be purged and reduced by the downstream device. In this way, cold-start HC emissions may also be reduced, along with the various advantages related to turbocharger coordination, etc.

Note that the various routines included herein may be used all together, or individually, if desired and may be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the controller.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for an exhaust system having a first turbine and a second turbine, comprising:
during a first duration when exhaust temperature is below a first temperature threshold:
directing exhaust gas through the second turbine and an emission-control device;
adjusting the second turbine to control intake boost;
during a second duration following the first where exhaust gas does not flow through the emission-control device:
directing exhaust gas through the first turbine; and
adjusting the first turbine to control intake boost; and
purging the emission-control device when exhaust temperature is above a second temperature threshold higher than the first temperature threshold.

2. The method of claim 1 wherein the emission-control device includes a zeolite.

3. The method of claim 1 wherein the emission-control device is a selective catalytic reducing device.

4. The method of claim 1 wherein the emission-control device is a diesel oxidation catalyst.

5. The method of claim 1 further comprising adjusting an expansion across the second turbine to control a rate of the purge and adjusting an expansion across the first turbine in response to the adjustment of the expansion across the second turbine.

6. The method of claim 1 wherein the purging occurs during low vehicle speed and/or low engine load conditions.

7. The method of claim 1 wherein the first temperature threshold is a temperature below which NOx will be substantially adsorbed by the emission-control device and above which NOx will be substantially desorbed by the emission-control device.

8. The method of claim 1 wherein the second temperature threshold is a temperature at which a NOx reducing device is sufficiently heated to become catalytically active.

9. The method of claim 8 wherein the NOx reducing device is a selective catalytic reducing device.

10. The method of claim 1 further comprising preloading a reductant prior to the purging.

11. The method of claim 1 wherein the turbines are variable geometry turbines.

12. The method of claim 1 wherein the turbines have wastegates.

13. The method of claim 1 wherein following a first engine start with a first amount of NOx in the emission control device, the first duration has a first length; and following a second engine start, different from the first start, with a second amount of NOx, in the emission control device, higher than the first amount, the first duration has a second length shorter than the first length.

14. A method for an exhaust system having first and second parallel turbines, comprising:
when exhaust temperature is below a threshold:
directing exhaust through the second turbine and an emission-control device, but not the first turbine; and
adjusting the second turbine to control intake boost;
after exhaust temperature rises above the threshold:
directing exhaust through the first turbine, but not the second turbine and the emission-control device; and
adjusting the first turbine to control intake boost.

15. A method for an exhaust system having a first turbine and a second turbine, comprising:
during a first duration when exhaust temperature is below a first temperature threshold:
directing exhaust gas through the second turbine and an emission-control device;
adjusting the second turbine to control intake boost;
during a second duration following the first duration where exhaust gas does not flow through the emission-control device:
directing exhaust gas through the first turbine; and
adjusting the first turbine to control intake boost; and
when transitioning from the first to the second duration, operating for a third duration in which the first turbine spins up in order to continue providing the boost previously supplied by the second turbine.

16. The method of claim 15 wherein turbo lag associated with the first turbine spin up during the transition is off-set by gradually decreasing expansion across the second turbine in correspondence with the gradual increase in expansion across the first turbine.

17. The method of claim 15 wherein the emission-control device includes a zeolite.

18. The method of claim 15 wherein the emission-control device is a selective catalytic reducing device.

19. The method of claim 15 wherein the threshold is a temperature below which NOx will be substantially adsorbed by the emission-control device and above which NOx will be substantially desorbed by the emission-control device.

* * * * *